(12) United States Patent
Conti et al.

(10) Patent No.: US 8,450,023 B2
(45) Date of Patent: *May 28, 2013

(54) FUEL CELL DESIGN BASED ON A FRAMED BIPOLAR PLATE

(75) Inventors: Amedeo Conti, Somerville, MA (US); Scott C. Blanchet, Chelmsford, MA (US); Filippo Gambini, Boston, MA (US)

(73) Assignee: Nuvera Fuel Cells, Inc., Billerica, MA (US)

( * ) Notice: Subject to any disclaimer, the term of this patent is extended or adjusted under 35 U.S.C. 154(b) by 777 days.

This patent is subject to a terminal disclaimer.

(21) Appl. No.: 12/489,398

(22) Filed: Jun. 22, 2009

(65) Prior Publication Data

US 2010/0015485 A1    Jan. 21, 2010

Related U.S. Application Data

(60) Provisional application No. 61/074,793, filed on Jun. 23, 2008.

(51) Int. Cl.
| | |
|---|---|
| *H01M 8/02* | (2006.01) |
| *H01M 8/10* | (2006.01) |
| *H01M 8/24* | (2006.01) |
| *H01M 2/14* | (2006.01) |

(52) U.S. Cl.
USPC ........... 429/452; 429/454; 429/469; 429/481; 429/512; 429/518

(58) Field of Classification Search
USPC ................ 429/479–485, 490–494, 512, 517, 429/520, 534, 452, 454, 463, 469, 518
See application file for complete search history.

(56) References Cited

U.S. PATENT DOCUMENTS

| | | | | |
|---|---|---|---|---|
| 5,565,072 | A * | 10/1996 | Faita et al. | 204/256 |
| 7,189,468 | B2 * | 3/2007 | Izenson et al. | 429/444 |
| 7,592,088 | B2 * | 9/2009 | Rock et al. | 429/480 |
| 8,101,319 | B2 * | 1/2012 | Mikhail et al. | 429/512 |
| 2002/0182472 | A1 * | 12/2002 | Molter et al. | 429/37 |
| 2003/0162077 | A1 * | 8/2003 | Ohtani et al. | 429/38 |
| 2004/0115510 | A1 * | 6/2004 | Yang et al. | 429/35 |
| 2005/0079400 | A1 | 4/2005 | Sugiura et al. | |
| 2005/0181264 | A1 * | 8/2005 | Gu et al. | 429/38 |
| 2005/0186459 | A1 | 8/2005 | Sugiura et al. | |
| 2006/0024561 | A1 * | 2/2006 | Sato et al. | 429/38 |
| 2006/0046128 | A1 * | 3/2006 | Rock et al. | 429/35 |
| 2006/0073373 | A1 * | 4/2006 | Andrin et al. | 429/36 |
| 2006/0099480 | A1 * | 5/2006 | Henderson | 429/35 |
| 2009/0075134 | A1 | 3/2009 | Tanaka et al. | |
| 2011/0195329 | A1 * | 8/2011 | Fuss et al. | 429/434 |

FOREIGN PATENT DOCUMENTS

| | | |
|---|---|---|
| WO | WO 2007/034617 A1 | 3/2007 |
| WO | WO 2007/129642 A1 | 11/2007 |

OTHER PUBLICATIONS international Search Report and Written Opinion issued from the European Patent Office in corresponding application PCT/US2009/003700, dated Oct. 22, 2009, 14 pages.

* cited by examiner

*Primary Examiner* — Joseph Drodge
(74) *Attorney, Agent, or Firm* — Finnegan, Henderson, Farabow, Garrett & Dunner, LLP

(57) ABSTRACT

This disclosure related to polymer electrolyte member fuel cells and components thereof.

29 Claims, 11 Drawing Sheets

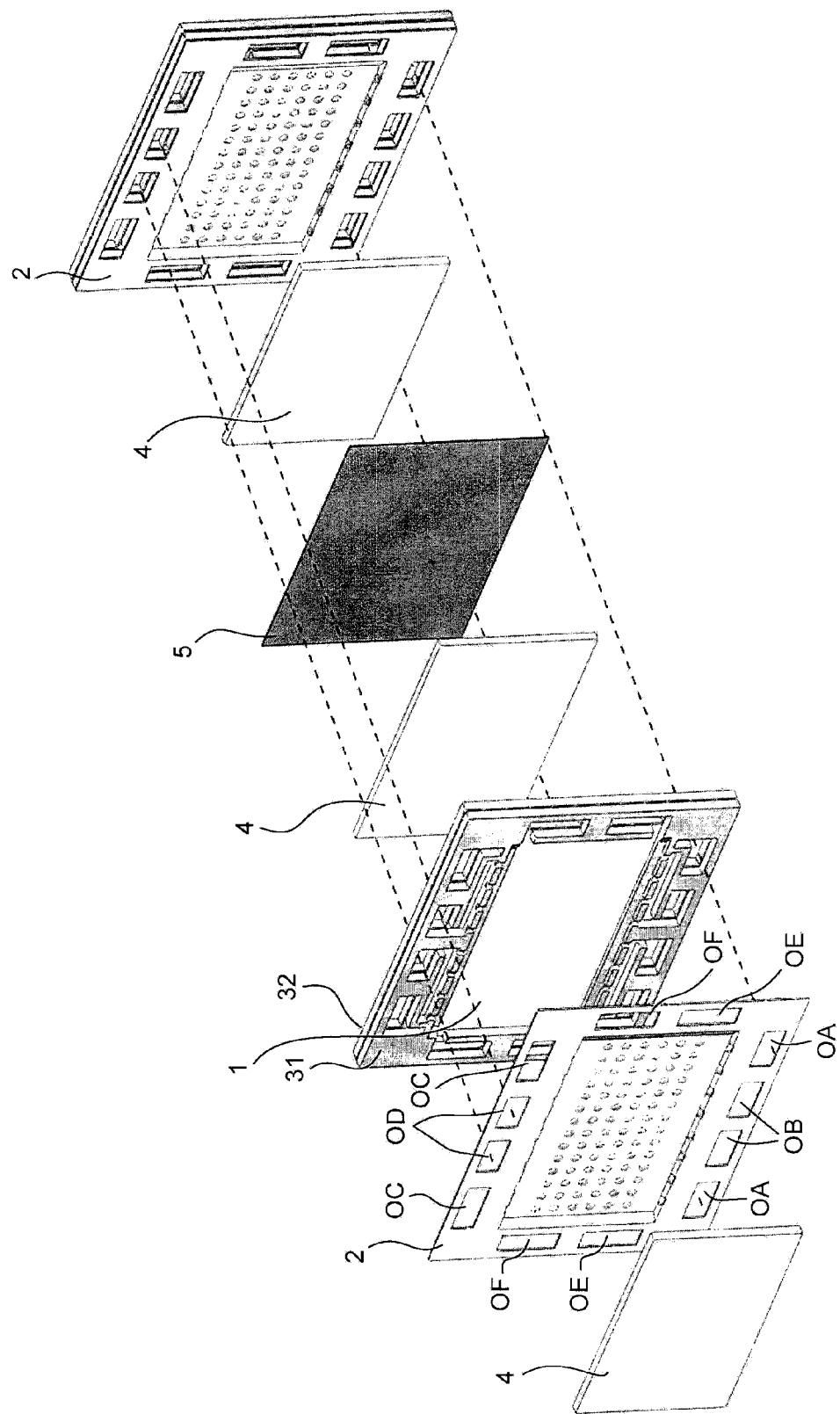

FUEL CELL DESIGN BASED ON A FRAMED BIPOLAR PLATE

CROSS REFERENCE TO RELATED APPLICATION

This application claims the benefit of U.S. Provisional Application No. 61/074,793, filed Jun. 23, 2008.

TECHNICAL FIELD

The present disclosure is directed to the field of polymer electrolyte membrane fuel cells.

BACKGROUND

A typical polymer electrolyte membrane ("PEM") fuel cell has a polymer membrane that serves as an electrolyte, supporting the conduction of protons according to its hydration level. The polymer membrane has two surfaces (or two sides). One surface is in contact with an anode electrode catalyst layer, while the other surface is in contact with a cathode electrode catalyst layer. The anode catalyst effectuates the dissociation of hydrogen into its constituent protons and electrons—the protons migrate through the membrane from its anode side to its cathode side, where they recombine with activated oxygen species to form water in the presence of the cathode catalyst.

SUMMARY

The disclosure provides a polymer electrolyte membrane fuel cell stack. The fuel cell stack comprises an electrochemical package having a cathode, an anode, and a polymer membrane interposed between the cathode and the anode. The fuel cell stack also comprises a first bipolar plate, a second bipolar plate, and an electrically conductive porous spacer. In an assembled fuel cell, the electrochemical package is disposed between the first and the second bipolar plate and the porous spacer is interposed between the first bipolar plate and the electrochemical package.

In an embodiment of a fuel cell stack disclosed herein, the second bipolar plate comprises a center portion and a peripheral portion. The center portion is non-flat, for example, comprising features such as protrusions, ridges or grooves, or in general a surface with raised areas and indented areas. The center portion also recedes from the plane where the peripheral portion of the second bipolar plate resides, forming a recess in the second bipolar plate.

In some embodiments, the fuel cell stack further comprises a first compartment interposed between the second bipolar plate and the electrochemical package, which may be formed by placing the electrochemical package over the recess in the second bipolar plate.

In other embodiments, the second bipolar plate comprises a plurality of first openings for introducing a fluid into the first compartment and a plurality of second openings for withdrawing the fluid from the first compartment.

The fuel cell stack disclosed herein may further comprise a first gasket. The first gasket has a peripheral portion and a center cavity. The peripheral portion comprises openings for the fuel gas inlet, the fuel gas outlet, the oxidant gas inlet, the oxidant gas outlet, the cooling fluid inlet, and the cooling fluid outlet, while the center cavity is adapted to receive the recess in the second bipolar plate. The first gasket further comprises a first channel connecting the fuel gas inlet and a plurality of first slots at an edge bordering the center cavity in the gasket. One of the first slots is in alignment with one of the first openings in the second bipolar plate. The first gasket also comprises a second channel connecting the fuel gas outlet and a plurality of second slots at an edge bordering the center cavity in the gasket. One of the second slots is in alignment with one of the second openings in the second bipolar plate.

Also disclosed herein is a bipolar plate assembly, which comprises a first gasket, a second gasket, and a first bipolar plate interposed between the first plate and the second bipolar plate. The first gasket can comprise a peripheral portion and a center cavity, and the peripheral portion can comprise openings for the fuel gas inlet, the fuel gas outlet, the oxidant gas inlet, the oxidant gas outlet, the cooling fluid inlet, and the cooling fluid outlet reside, The first gasket can further comprise a first channel connecting the fuel gas inlet and a plurality of first slots at an edge of said gasket bordering the center cavity in said gasket, and a second channel connecting the fuel gas outlet and a plurality of second slots at the edge of said gasket bordering the center cavity in said gasket.

In some embodiments of the bipolar plate assembly, wherein the first gasket and the second gasket are attached to the first bipolar plate by adhesion, injection molding, or mechanical fastening. In some other embodiments, the first gasket and the second gasket are attached to the first bipolar plate by overmolding so that the some edges of the bipolar plate, for example, an edge at the outer boundary of the plate, are covered by the gasket material.

In certain other embodiments, the bipolar assembly may also comprise a second bipolar plate interposed between the second bipolar plate and the first bipolar plate. The second bipolar plate may have protrusions what are in contact with the first bipolar plate through the center cavity in the first gasket.

The first bipolar plate disclosed here in can be a flat metal plate or of a non-flat geometric shape, for example, having ridges and grooves, or protrusions and indentations on its surface. The second bipolar plate may have protrusions rising on one side or on both sides.

This disclosure further provides a polymer electrolyte membrane fuel cell stack, which comprises an electrochemical package comprising a cathode, an anode, and an polymer membrane interposed between the cathode and the anode; a first bipolar plate comprising protrusions on both sides; a second bipolar plate comprising protrusions on both sides. The electrochemical package is disposed between the first and the second bipolar plate, the protrusions on the first bipolar plate are in contact with the electrochemical package, the protrusions on the second bipolar plate are in contact with the electrochemical package.

DESCRIPTION OF DRAWINGS

FIG. 1 is an assembly view showing components in a fuel cell stack according to this disclosure.

DETAILED DESCRIPTIONS

Figure 2A:
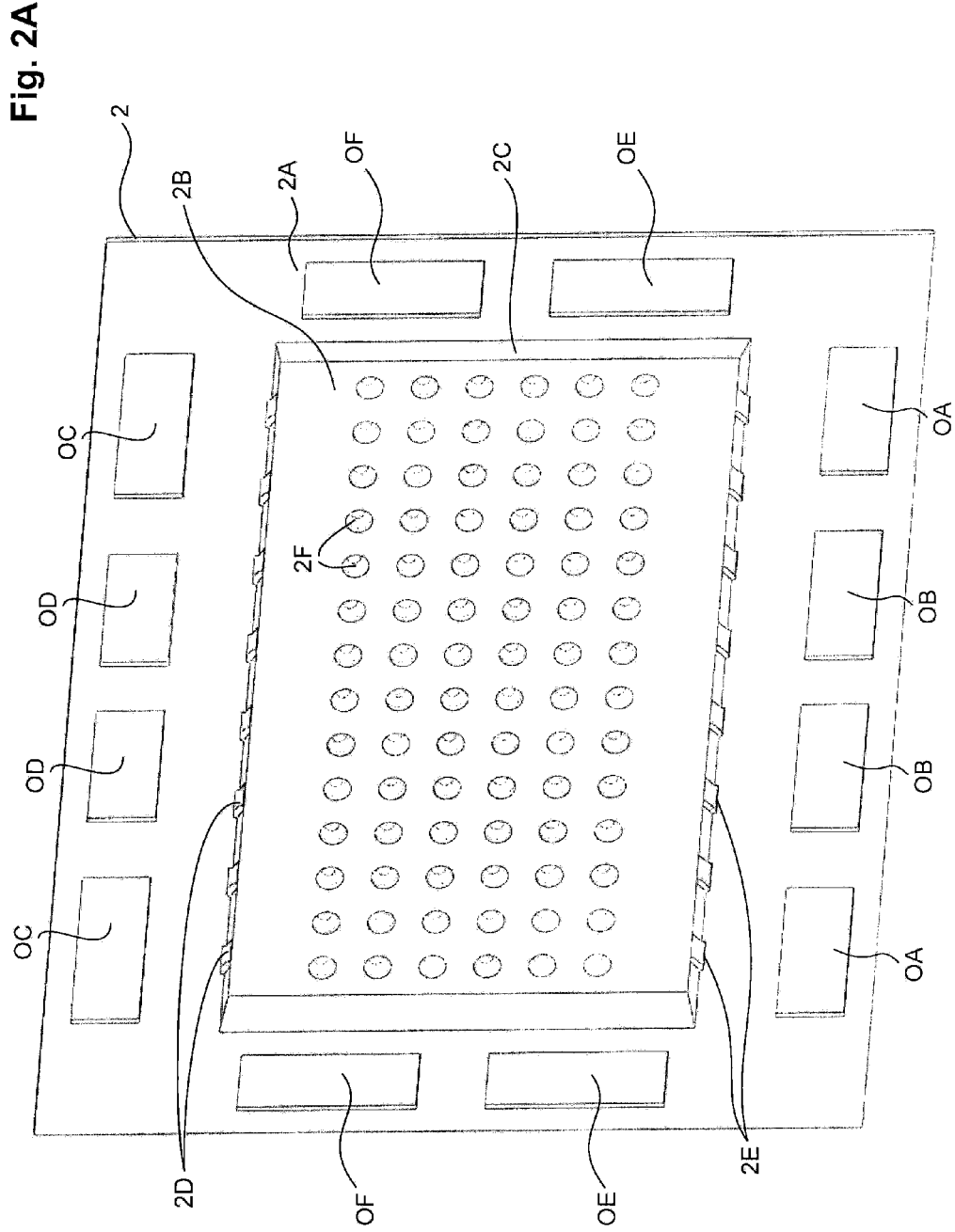
FIGS. 2A and 2B respectively represent the anode side an embodiment of the second bipolar plate and its reverse side according to this disclosure.

As disclosed herein, a membrane electrode assembly ("MEA") refers to a polymer membrane that has an anode catalyst on one side and an cathode catalyst on the reverse side. A conducting media known as a gas diffusion layer ("GDL") can be attached or situated adjacent to either or both of the two sides of the MEA. The gas diffusion layer is made of carbon paper, graphite cloth, or other porous, flexible, and electrically conductive materials, or composite assemblages thereof.

In certain embodiments, the electrode catalyst can be applied directly on the surface of the polymer membrane. In additional embodiments, the electrode catalyst can incorporated into catalyst layer adjacent to the polymer membrane. Alternatively, the catalyst can be applied on a gas diffusion layer, which is then chemically attached, mechanically attached, or placed adjacent to the polymer membrane, with the catalyst interposed between the gas diffusion layer and the polymer membrane. In the former case, the gas diffusion layer is not required for the fuel cell to function. As disclosed herein, an electrochemical package ("ECP") refers to a component comprising a MEA with gas diffusion layers attached to both sides, or a MEA with only one gas diffusion layer attached to one side, or a MEA without a gas diffusion layer attached to it. Accordingly, the anode of an ECP refers to the side of the ECP that contains the anode catalyst and the cathode of an ECP refers to the side of the ECP that contains the cathode catalyst, with or without a gas diffusion layer attached to it. Therefore, when a fuel cell component is in direct contact with an electrode of the ECP, it can either be in direct contact with the catalyst, the catalyst layer, or in direct contact with the gas diffusion layer.

A fuel gas, e.g., a hydrogen-containing gas, is fed to the anode compartment, which is the space between the anode of the ECP and an electrically conductive (e.g. graphite or metal) gas barrier, i.e., a bipolar plate. An oxidant gas, e.g., an oxygen-containing gas such as air, is fed to the cathode compartment, which is the space between the cathode of the ECP and a bipolar plate. Spacers may be used to create fluid passages in the anode compartment and cathode compartment, respectively. The spacer can be made from a material that is electrically conductive and by design allows fluids to pass through.

In certain embodiments, a single fuel cell comprises an ECP, an anode compartment, a cathode compartment, two bipolar plates, and optionally one or more spacers. A "fuel cell stack" comprises multiple single fuel cells connected electrically in series, usually with a cooling cell interposed between the anode compartment of one fuel cell and the cathode compartment of another fuel cell. A cooling fluid, gaseous or liquid or multiphase, passes through the cooling cell, and exchanges heat with the adjacent anode and cathode compartments to afford control of the temperature therein. In addition or alternatively, a water-based liquid coolant can mix with the anode gas or the cathode gas inside the anode or cathode compartment to accomplish temperature control.

FIG. 1 is an assembly view that shows components in a fuel cell according to this disclosure. In this embodiment, a fuel cell comprises an electrochemical package (5), a porous spacer (4), a second bipolar plate (2) having arrays of protrusion in its center portion, and a first bipolar plate (1) interposed between a first gaskets (31) and a second gasket (32). The first bipolar plate (1) is a flat metal plate, but it can also be a non-flat plate that forms a space when placed against a flat surface, for example, one with undulating ridges and valleys, or with arrays of protrusions, etc.

Furthermore, the second bipolar plate (2), the first bipolar plate (1), the first gasket (31), and the second gasket (32) each has multiple openings, including fuel gas inlets (OD), fuel gas outlets (OB), oxidant gas inlets (OA), oxidant gas outlet (OC), coolant fluid inlets (OE), and coolant fluid outlets (OF). When these components are assembled together to form a fuel cell or a fuel cell stack, the same type of openings in different components are in alignment, forming conduits for the fluids in the fuel cell or the fuel cell stack (see FIG. 1). In the embodiment of FIG. 1, the oxidant gas and the fuel gas flow counter-currently. However, other configurations of inlets and outlets are possible. For example, the openings (OC) can be used as the oxidant gas inlet while the openings (OA) can be used as the oxidant gas outlet. In such an arrangement, the oxidant gas and the fuel gas flow concurrently. Unless otherwise noted, openings for the inlets and outlets for the same fluids in different components have the same designation. For instance, the fuel gas inlets in the first and the second bipolar plates are all labeled as OD.

The anode side of the second bipolar plate (2) is shown in FIG. 2A. The anode side is the side of the second bipolar plate (2) that faces the anode of the electrochemical package (5). The second bipolar plate (2), the electrochemical package (5), and the first gasket (31) enclose an anode compartment, which serves as a passage for fuel gas during fuel cell operations.

In this embodiment, a porous spacer (4) is placed inside the anode compartment to provide a flow field for the fuel gas as well as to electrically connect the second bipolar plate and the anode of the electrochemical package.

One suitable porous spacer is a perforated metal sheet. A perforated metal sheet has repeated arrays of perforations, e.g., round holes, hexagonal holes, square holes, slotted hole, etc. Before installation as a spacer in a fuel cell compartment, a perforated metal sheet may be processed to form a non-flat geometric shape. For example, it can be stamped to form undulating ridges and grooves, or indentations and protrusions, or other geometric shapes. An example of a perforated metal sheet that is commercially available can be obtained from McNichols Co., Tampa, Fla. When installed between a bipolar plate and an ECP, the perforated metal sheet allow passages of flow along its surfaces as well as through the perforations in the metal sheet.

Another suitable porous spacer is an expanded metal mesh. An expanded metal mesh is made from sheets of solid metal that are uniformly slit and stretched to create openings of certain geometric shapes, e.g., a diamond shape. In a standard expanded metal, each row of diamond-shaped openings is offset from the next, creating an uneven structure. The standard expanded metal sheet can be rolled to produce a flattened expanded metal.

A further suitable porous spacer is a metal wire mesh, which can be made by weaving or welding metal wires together. Both metal wire mesh and expanded metal mesh are commercially available, for example, from Mechanical Metals, Inc. of Newtown, Pa. When used as a spacer, the expanded metal mesh and the metal wire mesh may first be processed to form a non-flat geometric shape.

A piece of metal foam or graphite foam can also be used as a spacer. The foam has a reticulated structure with an interconnected network of ligaments. Because of this unique structure, the foam material in its uncompressed state can have a porosity that reaches 75%, such as greater than 80%, greater than 85%, greater than 90%, greater than 95%, and up to 98%. Metal foams are commercially available, for example, from Porvair Advanced Materials, Inc., Hendersonville, N.C. Graphite foams are also commercially available, for example, from Poco Graphite, Inc., Decatur, Tex.

Figure 2B:
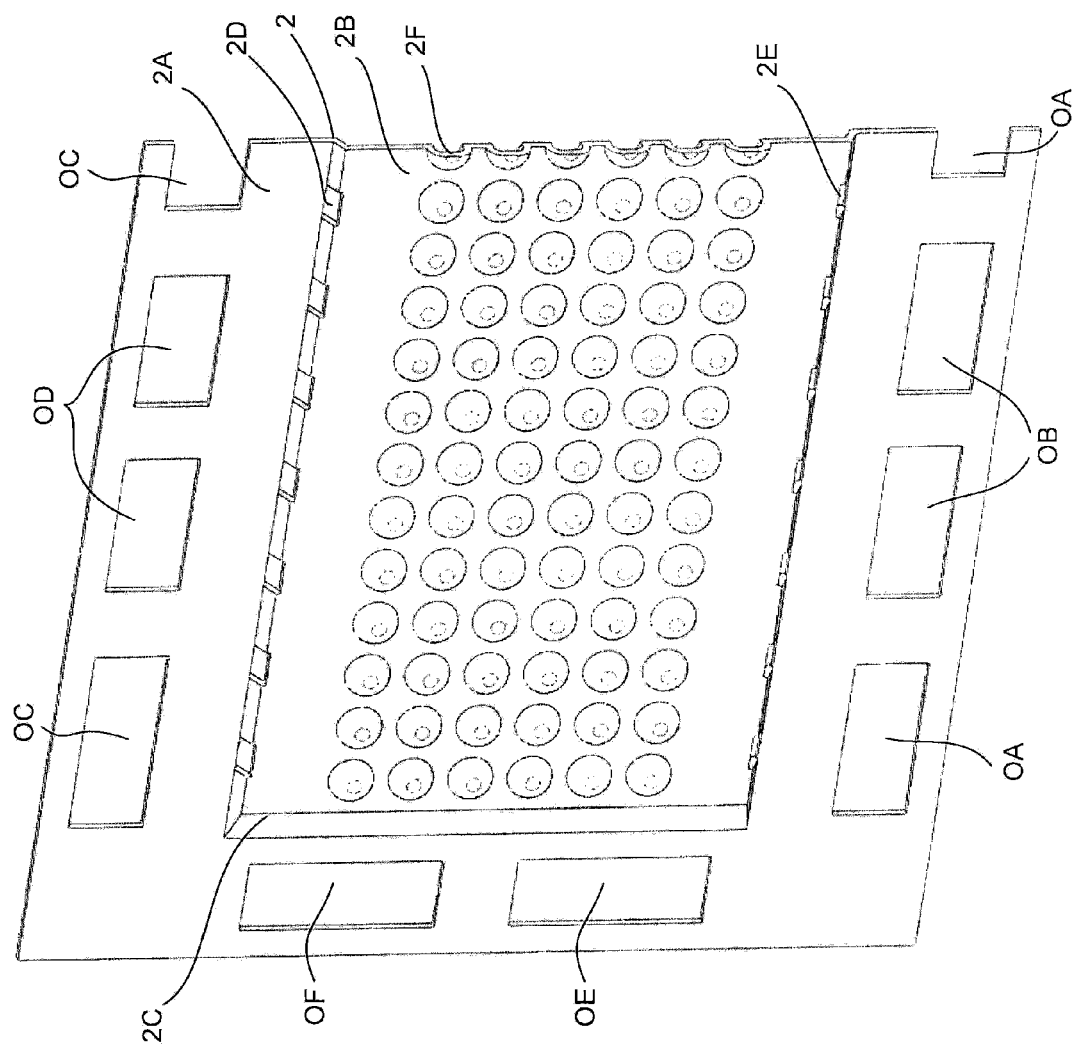

FIG. 2B shows the reverse side of the second bipolar plate (2). In the embodiment according to FIGS. 2A and 2B, the second bipolar plate (2) comprises a peripheral portion (2A), a center portion (2B), and a transition area (2C). The center portion (2B) is receded from the plane where the peripheral portion (2A) resides. The transition area (2C) is the portion of the plate between the peripheral portion (2A) and the center portion (2B). The center portion (2B) has arrays of protrusions (2F) in the shape of, for example, semispherical protrusions and a flat area. The second bipolar plate recedes from the anode compartment, so that the protrusions rise above the flat area from the reverse side of the second bipolar plate (2) (see FIG. 2B).

One aspect of the second bipolar plate (2) is that its center portion (2B) is not flat. Other than having protrusions of various shapes, the center portion may have ridges or grooves, or otherwise features that provides it a raised (or indented) surface. One further aspect of the second bipolar plate (2) is that the plane where the center portion (2B) resides can be parallel or at an angle with the plane where the peripheral portion (2B) resides.

Furthermore, the shortest distance between the plane where the peripheral portion (2A) resides and the plane where the flat area of the center portion (2B) resides is the depth of the recess, which can range from 0.1 to 3 mm, for example, from 0.1 to 2.5 mm, from 0.2 to 2 mm, from 0.4 to 1 mm.

In addition to openings for fluid passage in its peripheral region (2A), the second bipolar plate (2) also has a plurality of first openings (2D) and second openings (2E) arranged in the transition area (2C). These openings are for passages of the fuel gas into and out of the anode compartment.

Figure 3:
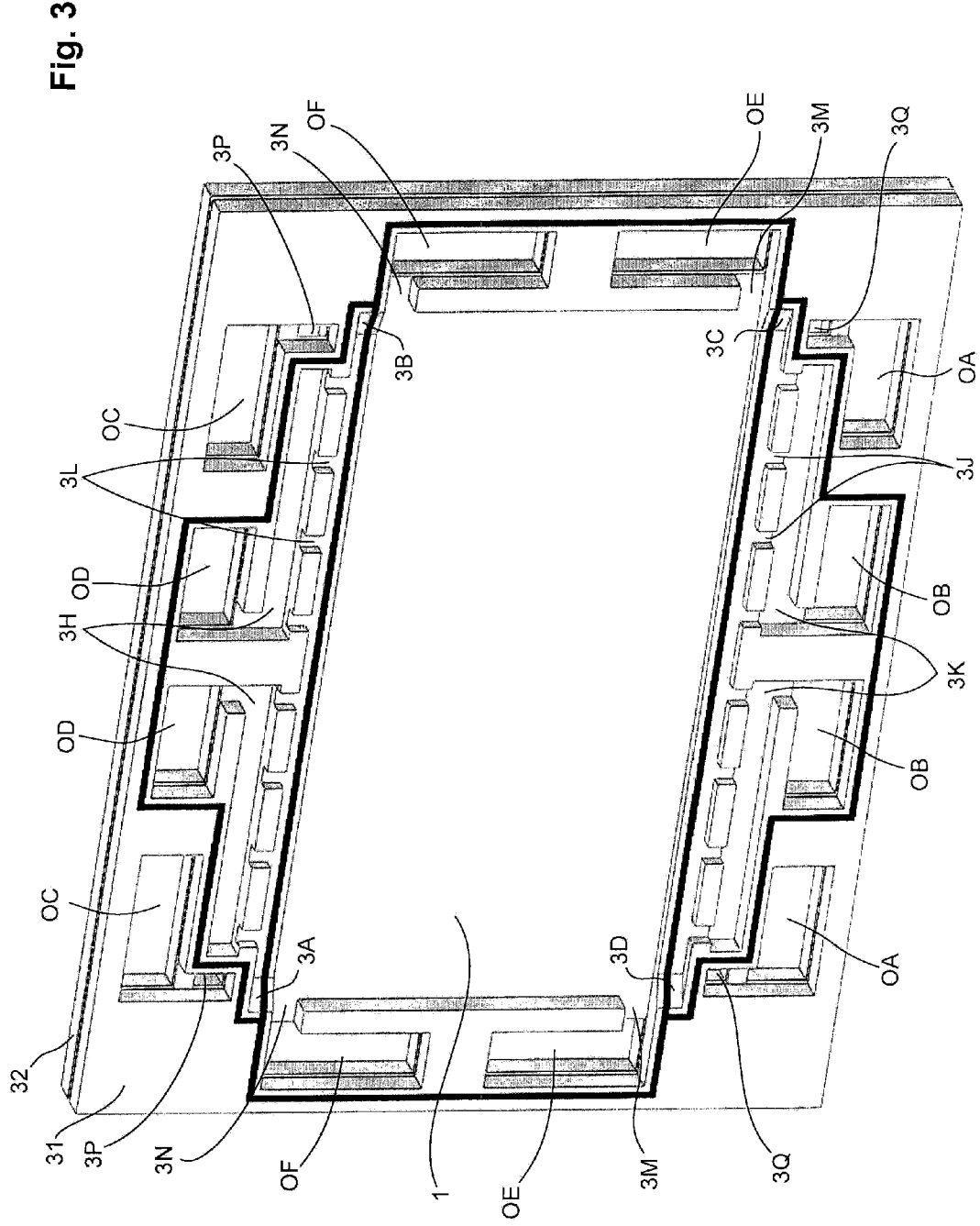
FIG. 3 shows an embodiment of a first gasket attached to the first bipolar plate.

FIG. 3 shows an embodiment of the first gasket (31). It has fluid channels (3H) extending from fuel gas inlets (OD) to the inner edge of the gasket, where multiple slots (3L) open to the cavity in the center of the gasket. On the other hand, slots (3J) and channels (3K) connect the center cavity with the fuel gas outlets (OB). The center cavity in first gasket (31) is adapted to receive the center portion (2B) of the second bipolar plate (2). Sections (3A), (3B), (3C), and (3D) are slopes on the surface of gasket. The portions of the gasket between (3A) and (3B) as well as between (3C) and (3D) recede from the surface of the gasket to provide a seat for the center portion (2B) of the second bipolar plate (2).

The black lines on the surface of the first gasket in FIG. 3 indicate ridges of a sealing material, e.g., an elastomeric material. The sealing material can be the same or different from the gasket material. The sealing material can comprise a component that is distinct from the gasket, such as an O-ring, or be an integral part of the gasket, such as made by molding the sealing material ridge on the gasket.

When compressed against the second bipolar plate (2), the sealing material ridge forms seals around the openings encircled by the sealing ridge. Note that the sealing material ridge encircles an area that includes the cooling fluid inlets (OE) and outlets (OF), as well as the center cavity. Two sections of the sealing material ridges, one between sections (3A) and (3B) and the other between sections (3C) and (3D), reside on a first plane. Some other sections of the sealing material ridges, such as those at the outmost periphery of the sealing material ridges, can reside on a second plane. In the embodiment according to FIG. 3, these two planes are parallel to each other, and the distance between them can equal the depth of the recess in the second bipolar plate.

Sections (3A), (3B), (3C), and (3D) are transition sections that connect the first and the second planes. Accordingly, the sealing material ridges on sections (3A), (3B), (3C), and (3D) connect the sealing material ridges residing on the first and the second planes. When the first gasket is compressed against a second bipolar plate, the sealing material ridge on the first plane is in contact with the center portion of the second bipolar plate while the sealing material ridge on the second plane is in contact with the peripheral portion of the second bipolar plate. Furthermore, the sealing material ridges seal the fluid in slots (3L) and (3J) from the cooling fluid compartment.

Figure 4:
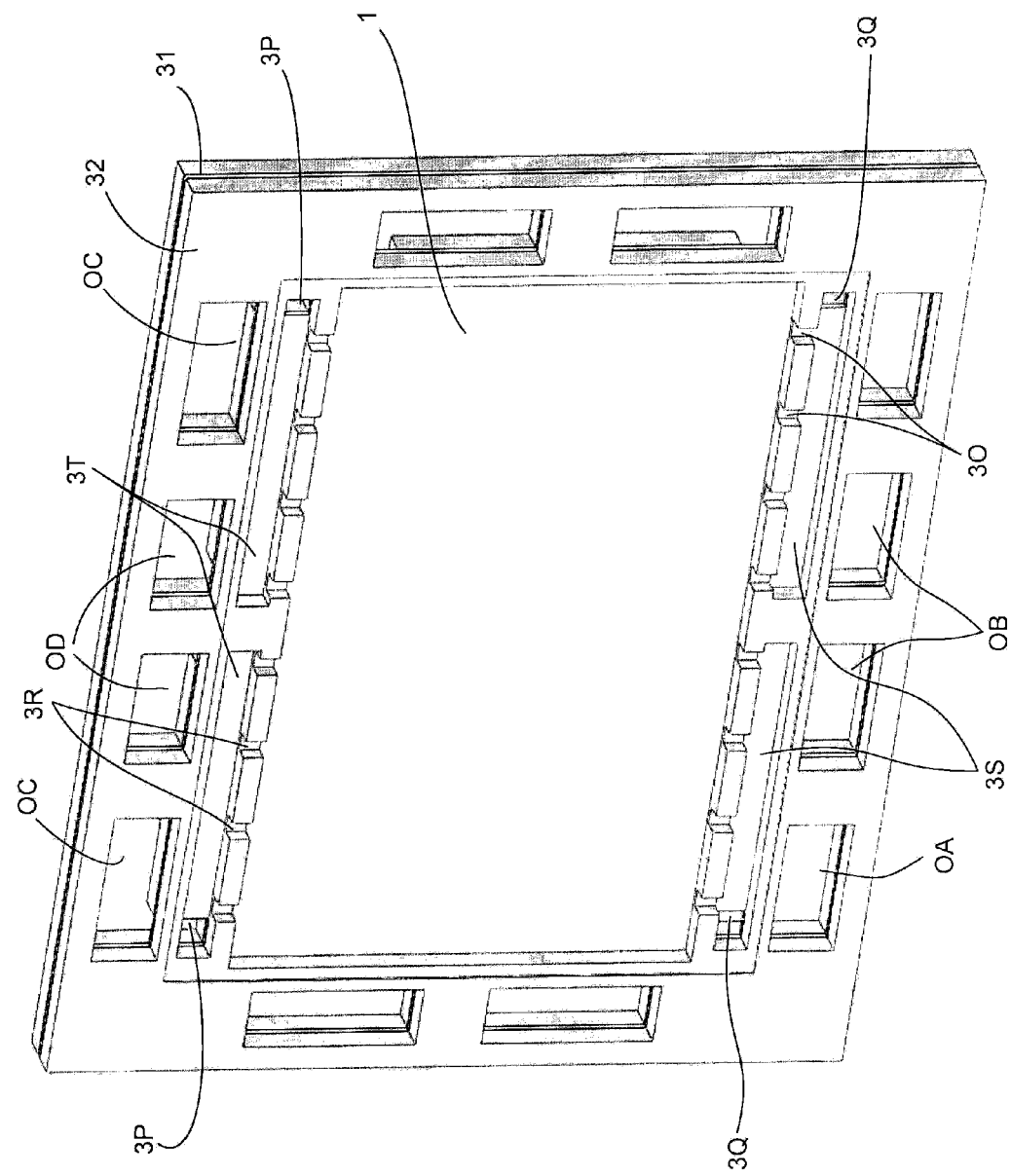
FIG. 4 shows an embodiment of a second gasket attached to the first bipolar plate.

FIG. 4 shows details in an embodiment of the second gasket (32). In addition to common fluid inlets and outlet, the second gasket has fluid channels (3S) and slots (30) that guide an oxidant gas to the center cavity of the gasket, while slots (3R) and channels (3T) form the exit path of the oxidant gas, as explained in more details in the following.

Figure 5:
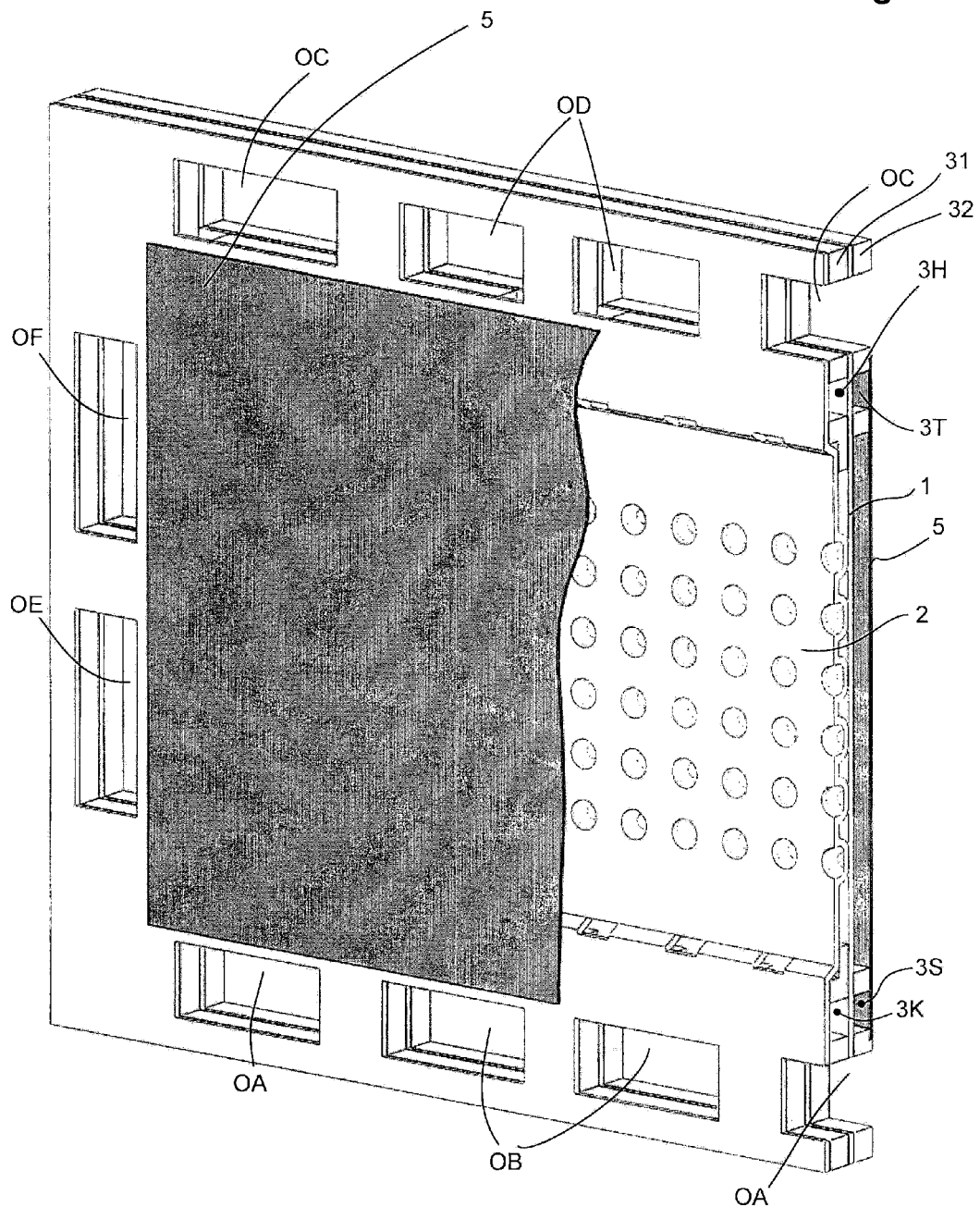
FIG. 5 illustrates an assembly of fuel cell components that has an anode compartment, a cathode compartment, and a cooling fluid compartment.

FIG. 5 shows components in an assembled fuel cell stack according to this disclosure. An anode compartment is formed by placing the electrochemical package (5) over the recess in the second bipolar plate (2). A porous spacer resides in the anode compartment but is not shown FIG. 5 for clarity. The electrochemical package (5), the cathode side of the first bipolar plate (1), and the second gasket (32) enclose the cathode compartment. The cooling fluid compartment is enclosed by the first bipolar plate (1), the second bipolar plate (2), and the first gasket (31). The protrusions in the second bipolar plate (2) touch the first bipolar plate (1), creating the flowfield for the cooling fluid.

Figure 6:
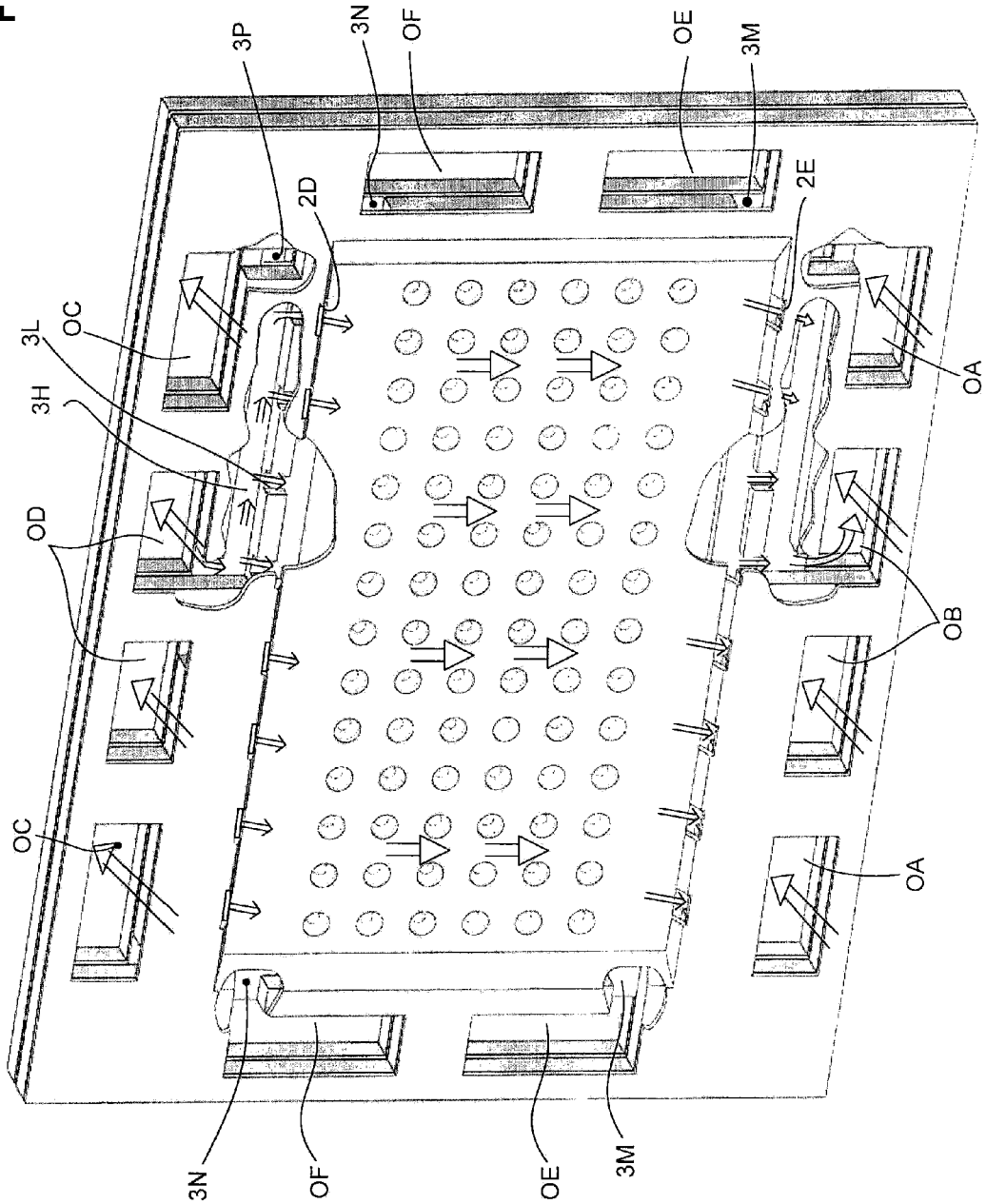
FIG. 6 is a schematic illustration of the passage of the fuel gas in the anode compartment.

As expressed in FIGS. 5 and 6, in combination with FIGS. 2A and 3, in a functional fuel cell, the center portion (2B) of the second bipolar plate (2) seats in the center cavity of the gasket (31). The sealing ridges are compressed by the second bipolar plate and form seals around areas they encircle (see FIG. 3). Meanwhile, the first openings (2D) and the second openings (2E) in the second bipolar plate (2) are aligned with the slots (3L) and (3J) respectively. Consequently, the fuel gas passes through channel (3H), slots (3L), and the first openings (2D), entering the anode compartment (see FIG. 6). The fuel gas exits the anode compartment through the second opening (2E), slots (3J), and channels (3K) into fuel gas outlets (OB).

Figure 7:
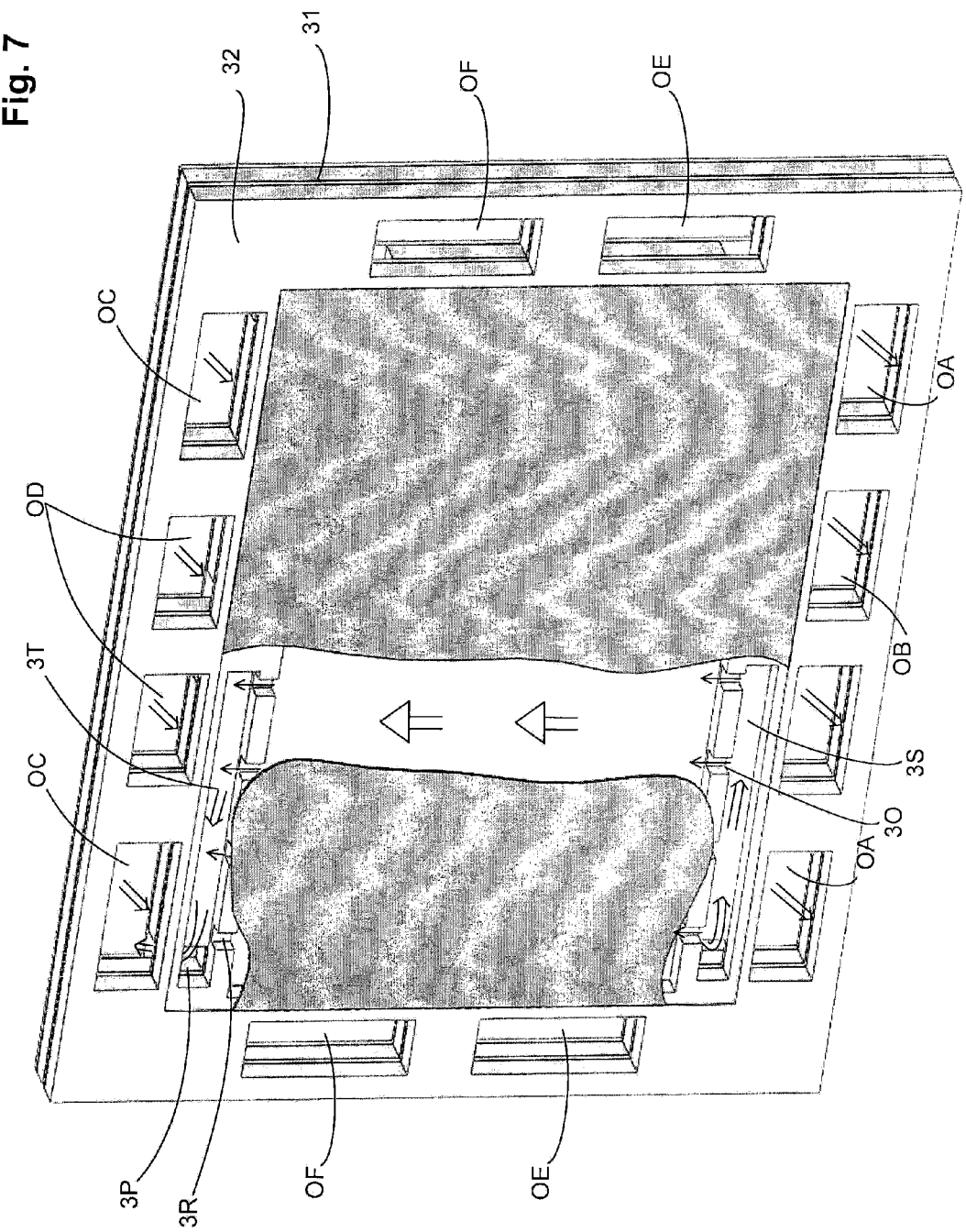
FIG. 7 is a schematic illustration of the passage of the oxidant gas in the cathode compartment.

On the other hand, the oxidant gas enters from oxidant gas inlet (OA) in the first gasket (31), passing through openings (3Q) in the first bipolar plate (1) to the cathode side of the first bipolar plate (1). The oxidant gas then flows through channels (3S) and slots (30) into the cathode compartment. A porous spacer resides in the cathode compartment, which is not shown in the drawing for clarity. The oxidant gas exits the cathode compartment through the slots (3R) and channels (3T), crossing the first bipolar plate (3) through the openings (3P) to arrive at the oxidant outlets (OA) in the first gasket (31) (see FIG. 7).

Figure 8:
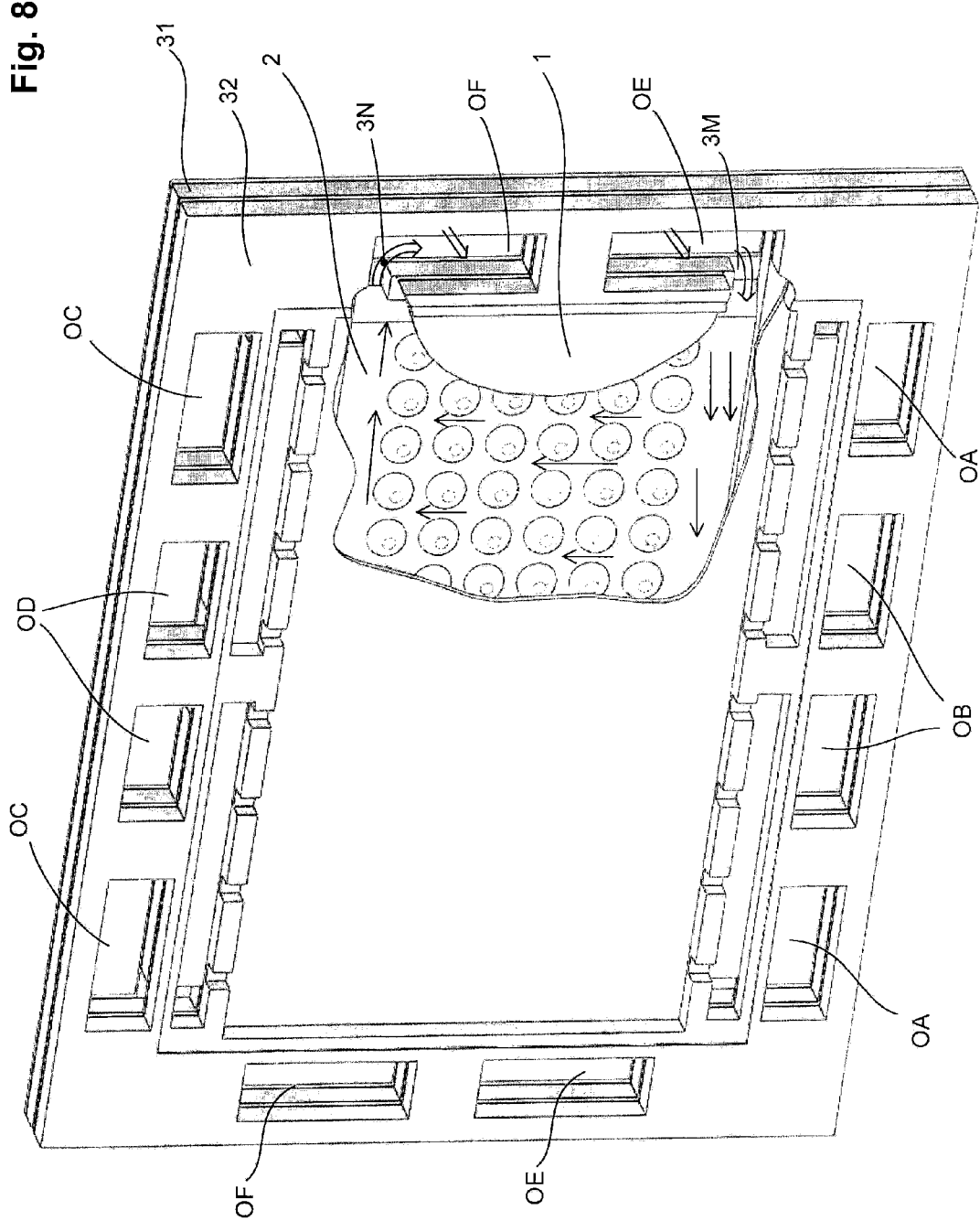
FIG. 8 a schematic illustration of the passage of the cooling fluid in the cooling fluid compartment.

The first gasket (31) also has openings (3M) and (3N). In this embodiment, openings (3M) allow the cooling fluid to enter the cooling compartment while openings (3N) are the exits for the cooling fluid (see FIG. 8). The protrusions (2D) in the second bipolar plate forms obstacles in the fluid passage so that the cooling fluid may be distributed in a more uniform fashion over the cooling fluid compartment. Note that arrows in FIGS. 6, 7, and 8 indicate the general directions of the fluids, not the precise flow patterns.

Figure 9:
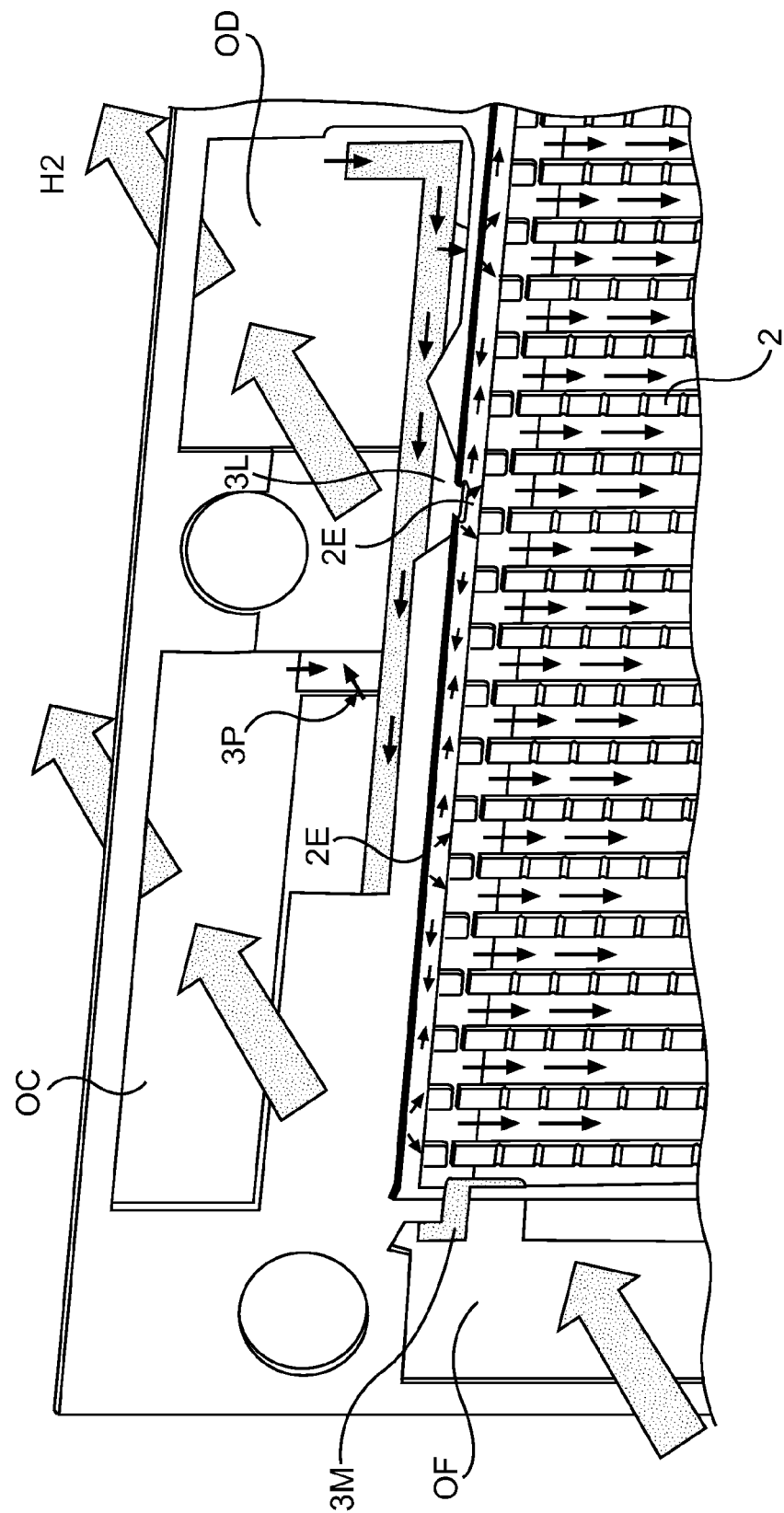
FIG. 9 shows another embodiment of the second bipolar plate.
Figure 10:
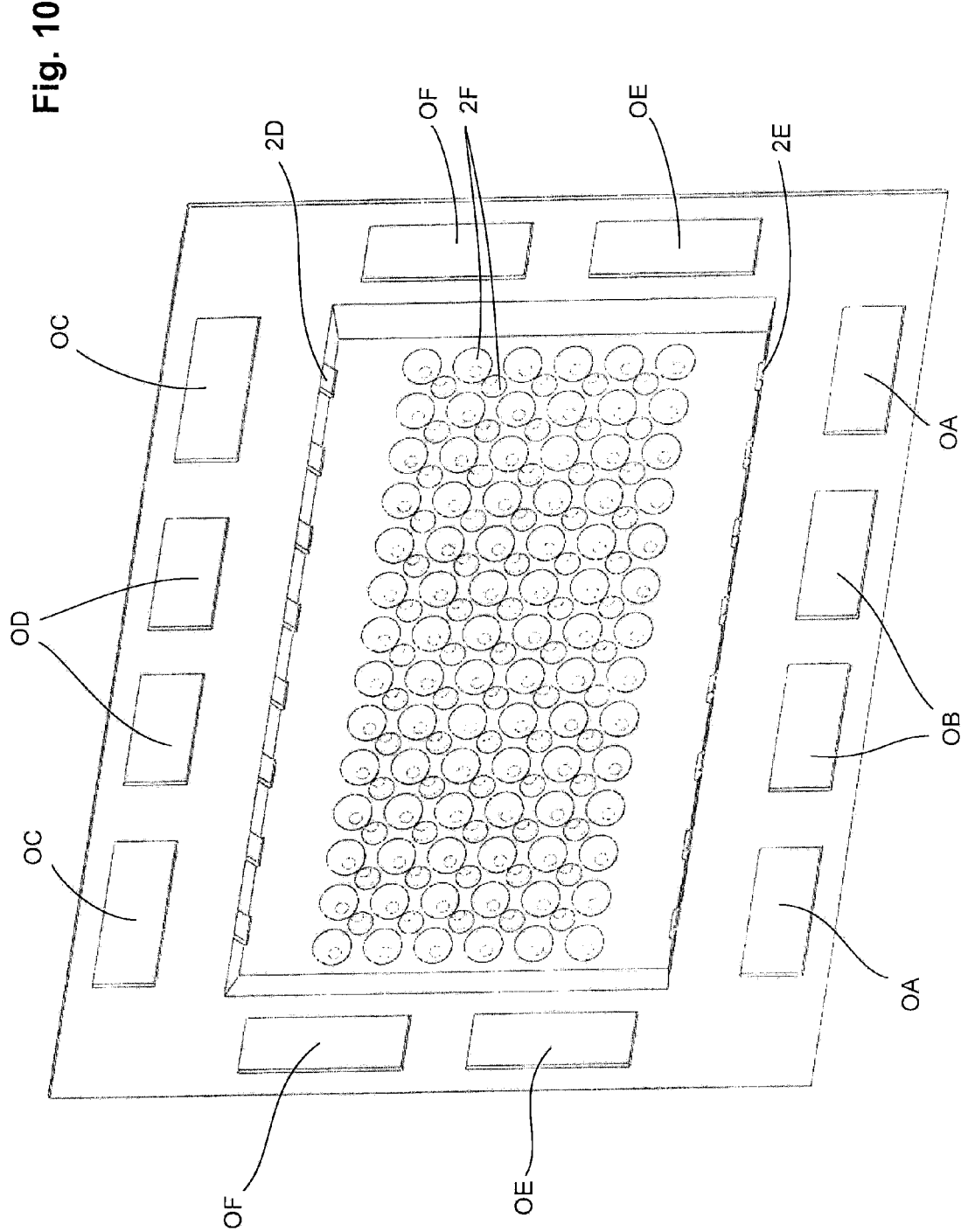
FIG. 10 shows a further embodiment of the second bipolar plate.

FIG. 9 illustrates another embodiment of the second bipolar plate (2). All other components are identical with those disclosed in FIGS. 1 to 8 except the second bipolar plate (2), which has interconnected channels rather than semispherical protrusions. FIG. 10 shows another embodiment of the second bipolar plate (2), which has protrusions on both sides of the plate.

In certain embodiments, the second bipolar plate may not have a recess. Instead, the bases of the protrusions are on the same plane where the peripheral portion of the plate resides. Accordingly, when interposed between two flat surfaces, for example, an electrochemical package and a first bipolar plate, protrusions on the anode side of the second bipolar plate contacts the electrochemical package while protrusions on the other side touches the first bipolar plate. Accordingly, the bipolar plate in this embodiment provide flowfields for fuel gas and the cooling fluid. It also connects the first bipolar plate and the electrochemical package. In this embodiment, a porous spacer may not be required either in the cooling fluid compartment or in the anode compartment.

In a further embodiment of this disclosure, the first bipolar plate (1) can have a surface that is non-flat. For instance, it can have undulating ridges and valleys, protrusions, other suitable patterns that create a space between the first bipolar plate and another object.

Furthermore, in all embodiments of the fuel cell disclosed above, the anode compartment can be used as a cathode compartment and vice versa. For example, the reverse can be accomplished by reversing the electrochemical package without further change in the configuration of the fuel cell.

In yet another embodiment, the gaskets (31, 32) can be attached to the first bipolar plate (1) using an adhesive, by injection molding, or by any other known methods to attach a gasket material to a metal surface. For example, the first bipolar plate can undergo an overmolding process to form a single unit having the first bipolar plate with the first gasket (31) on one side and a second gasket (32) on the other side. This single unit may be beneficial since it reduces the total number of components in a fuel cell.

In another embodiment of this disclosure, the first gasket, the second gasket, and the first bipolar plate interposed therebetween can form a bipolar plate assembly. The bipolar plate assembly may be integrated together by adhesion, injection molding, or other known methods for adhering a gasket to a metal surface. In one embodiment, the first and the second gasket can be overmolded on the first bipolar plate. In such an embodiment, the gasket material can be molded around the edges of the first bipolar plate around its outer boundary as well as its openings for various fluids, if desirable.

In addition, a bipolar plate assembly may also comprise the second bipolar plate, which has a raised surface, e.g. ridges and grooves or a plurality of protrusions, in its center portion. The second bipolar plate may be placed adjacent to the first gasket. Its raised surface may be in contact with the first bipolar plate, forming fluid passages inbetween.

It will be apparent to those skilled in the art that various modifications and variations can be made without departing from the spirit of the invention. The present invention covers all such modifications and variations, provided they come within the scope of the claims and their equivalents.

We claim:

1. A polymer electrolyte membrane fuel cell stack, comprising:

an electrochemical package comprising a cathode, an anode, and an polymer membrane interposed between the cathode and the anode;

a first bipolar plate;

a second bipolar plate comprising a center portion, a peripheral portion, and a recess formed by the center portion of the second bipolar plate receding from the plane where the peripheral portion of the second bipolar plate reside; and an electrically conductive porous spacer;

wherein the electrochemical package is disposed between the first and the second bipolar plate, the porous spacer is interposed between the first bipolar plate and the electrochemical package, and a first compartment is interposed between the second bipolar plate and the electrochemical package.

2. The fuel cell stack of claim 1, wherein the center portion of the second bipolar plate comprises a plurality of protrusions, or ridges and grooves, or a combination thereof.

3. The fuel cell stack of claim 1, wherein the first compartment is formed by placing the electrochemical package over the recess in the second bipolar.

4. The fuel cell stack of claim 1, wherein the porous spacer resides in the first compartment.

5. The fuel cell stack of claim 1, wherein the second bipolar plate further comprises a plurality of first openings for introducing a fluid into the first compartment and a plurality of second openings for withdrawing the fluid from the first compartment.

6. The fuel cell stack of claim 5, wherein the first compartment is an anode compartment and the fluid is a fuel gas.

7. The fuel cell stack of claim 5, wherein the first compartment is a cathode compartment and the fluid is an oxidant gas.

8. The fuel cell stack of claim 5, further comprising a first gasket comprising a peripheral portion and a center cavity, wherein the peripheral portion comprises openings for a fuel gas inlet, a fuel gas outlet, an oxidant gas inlet, an oxidant gas outlet, a cooling fluid inlet, and a cooling fluid outlet, wherein the center cavity is adapted to receive the recess in the second bipolar plate, wherein the first gasket further comprises a first channel connecting the fuel gas inlet and a plurality of first slots at an edge of said gasket bordering the center cavity in said gasket, one of the first slots is in alignment with one of the first openings in the second bipolar plate; and a second channel connecting the fuel gas outlet and a plurality of second slots at the edge of said gasket bordering the center cavity in said gasket, one of the second slots is in alignment with one of the second openings in the second bipolar plate.

9. The fuel cell stack of claim 8, wherein the first gasket comprises a sealing material ridge, wherein the sealing material ridge comprises sections that reside on a first plane and sections that reside on a second plane that is in parallel with the first plane.

10. The fuel cell stack of claim 9, wherein the distance between the first plane and the second plane equals the depth of the recess in the second bipolar plate.

11. The fuel cell stack of claim 10, wherein the sealing material ridge further comprises a section that resides on a third plane that intersects with the first and the second plane, said section of sealing material ridge connects with a section of the sealing material ridge on the first plane and a sealing material ridge on the second plane.

12. The fuel cell stack of claim 9, wherein the sections in the sealing material ridge encircles the center cavity of the first gasket.

13. The fuel cell stack of claim 9, wherein a second gasket is placed on the side of the first bipolar plate that is opposite to the side where the first gasket resides.

14. The fuel cell stack of claim 13, wherein the first gasket and the second gasket are attached to the first bipolar plate by injection molding, by adhesion, by compression molding, or by screen printing.

15. The fuel cell stack of claim 8, wherein the protrusions on the second bipolar plate are in contact with the first bipolar plate, and the first gasket, the first bipolar plate, and the second bipolar plate enclose a second compartment.

16. The fuel cell stack of claim 15, wherein the second compartment receives a cooling fluid.

17. The fuel cell stack of claim 1, wherein the first bipolar plate is a flat metal plate.

18. The fuel cell stack of claim 1, wherein the first bipolar plate comprises protrusions, or ridges and grooves, or a combination thereof.

19. The fuel cell stack of claim 1, wherein the center portion of the second bipolar plate comprises protrusions on both sides.

20. The fuel cell stack of claim 19, wherein the second bipolar plate is interposed between the electrochemical package and the first bipolar plate.

21. The fuel cell stack of claim 20, wherein the second bipolar plate comprises protrusions that rise on both sides of the second bipolar plate.

22. A bipolar plate assembly, comprising:
a first gasket;
a second gasket; and
a first bipolar plate interposed between the first gasket and the second gasket,
a second bipolar plate comprising a center portion, a peripheral portion, and a recess formed by the center portion of the second bipolar plate receding from the plane where the peripheral portion of the second bipolar plate resides,
wherein the first gasket is interposed between the second bipolar plate and the first bipolar plate, and comprises a peripheral portion and a center cavity, the peripheral portion comprises openings for a fuel gas inlet, a fuel gas outlet, an oxidant gas inlet, an oxidant gas outlet, a cooling fluid inlet, and a cooling fluid outlet reside,
wherein the first gasket further comprises a first channel connecting the fuel gas inlet and a plurality of first slots at an edge of said gasket bordering the center cavity in said gasket, and a second channel connecting the fuel gas outlet and a plurality of second slots at the edge of said gasket bordering the center cavity in said gasket.

23. The bipolar plate assembly of claim 22, wherein the second gasket and the first bipolar plate each comprises openings for the fuel gas inlet, the fuel gas outlet, the oxidant gas inlet, the oxidant gas outlet, the cooling fluid inlet, and the cooling fluid outlet reside, wherein the openings in the first gasket, the second gasket, and the first bipolar plate are in alignment to form conduits for conduits for the fuel gas inlet, the fuel gas outlet, the oxidant gas inlet, the oxidant gas outlet, the cooling fluid inlet, and the cooling fluid outlet reside.

24. The bipolar plate assembly of claim 22, wherein the first gasket and the second gasket are attached to the first bipolar plate by adhesion, injection molding, or mechanical fastening.

25. The bipolar plate assembly of claim 22, wherein the first gasket and the second gasket are attached to the first bipolar plate by overmolding.

26. The bipolar plate assembly of claim 22, wherein the second bipolar plate comprises ridges and grooves or a plurality of protrusions.

27. The bipolar plate assembly of claim 22, wherein the protrusions on the second bipolar plate are in contact with the first bipolar plate.

28. The bipolar plate assembly of claim 22, wherein the second bipolar plate, the first gasket, first bipolar plate, and the second gasket are bonded together by adhesion, injection molding, or mechanical fastening.

29. A polymer electrolyte membrane fuel cell stack, comprising:
an electrochemical package comprising a cathode, an anode, and an polymer membrane interposed between the cathode and the anode;
a first bipolar plate comprising protrusions on both sides;
a second bipolar plate comprising protrusions on both sides; and
wherein the electrochemical package is disposed between the first and the second bipolar plate, the protrusions on the first bipolar plate are in contact with the electrochemical package, the protrusions on the second bipolar plate are in contact with the electrochemical package.

* * * * *

UNITED STATES PATENT AND TRADEMARK OFFICE
CERTIFICATE OF CORRECTION

PATENT NO. : 8,450,023 B2
APPLICATION NO. : 12/489398
DATED : May 28, 2013
INVENTOR(S) : Amedeo Conti, Scott Blanchet and Filippo Gambini Page 1 of 1

It is certified that error appears in the above-identified patent and that said Letters Patent is hereby corrected as shown below:

In the Claims

Claim 1, Col. 8, Line 9, "reside" should read --resides--.

Claim 23, Col. 10, Line 13, "conduits for conduits for" should read --conduits for--.

Signed and Sealed this
Seventh Day of January, 2014

Margaret A. Focarino
*Commissioner for Patents of the United States Patent and Trademark Office*